(12) United States Patent
McKinzie et al.

(10) Patent No.: US 8,589,209 B2
(45) Date of Patent: *Nov. 19, 2013

(54) SYSTEM AND METHOD FOR ASSESSING VIABILITY AND MARKETABILITY OF ASSETS

(75) Inventors: Christopher W. McKinzie, Lakeway, TX (US); Andrew W. Allemann, Austin, TX (US)

(73) Assignee: Fluid Innovation Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,512

(22) Filed: Jul. 2, 2012

(65) Prior Publication Data

US 2013/0090985 A1    Apr. 11, 2013

Related U.S. Application Data

(63) Continuation of application No. 12/011,842, filed on Jan. 29, 2008, now Pat. No. 8,214,248.

(60) Provisional application No. 60/887,043, filed on Jan. 29, 2007, provisional application No. 60/964,324, filed on Aug. 9, 2007.

(51) Int. Cl.
*G06F 17/00* (2006.01)

(52) U.S. Cl.
USPC ........................................................ 705/7.32

(58) Field of Classification Search
USPC ........................................................ 705/7.32
See application file for complete search history.

(56) References Cited

U.S. PATENT DOCUMENTS 6,029,195 A * 2/2000 Herz ............................. 725/116

* cited by examiner

*Primary Examiner* — Thomas Dixon
(74) *Attorney, Agent, or Firm* — Carr & Ferrell LLP (57) ABSTRACT

Systems and methods for assessing viability and marketability of an asset are provided. In exemplary embodiments, an asset assessment system receives disclosure information for the asset. The disclosure information comprises information indicating at least one taxonomy segment associated with the asset. An attribute grade may then determined based on the disclosure information, while a market grade may be determined based on market data for the at least one taxonomy segment. A final grade based on the attribute grade and the market grade is then calculated. This final grade provides an indication of the viability and marketability of the asset. The final grade may then be output.

18 Claims, 6 Drawing Sheets

SYSTEM AND METHOD FOR ASSESSING VIABILITY AND MARKETABILITY OF ASSETS

CROSS-REFERENCE TO RELATED APPLICATION

The present application is a continuation of U.S. patent application Ser. No. 12/011,842, filed Jan. 29, 2008, now U.S. Pat. No. 8,214,248 titled "System and Method for Assessing Viability and Marketability of Assets," which claims the priority benefit of U.S. Provisional Patent Application No. 60/887,043, filed Jan. 29, 2007, and entitled "System and Method for Automatically Assessing the Commercial Viability of Software" and to U.S. Provisional Patent Application No. 60/964,324, filed Aug. 9, 2007, and entitled "System and Method for Automatically Assessing the Commercial Viability and Market Value of Intellectual Property Assets," all of which are hereby incorporated by reference.

BACKGROUND OF THE INVENTION

1. Field of the Invention

This invention relates generally to identifying assets, and more particularly to assessing viability and marketability of assets.

2. Description of the Background Art

Many entities, including but not limited to enterprises, universities, research and development labs, for example, typically generate and maintain assets on a regular basis. In some embodiments, intellectual property assets may be generated on a periodical basis, such as daily. These intellectual property assets may comprise new or revised software scripts, engineering designs, technologies, processes for performing an activity, or any other innovative solutions, be it tangible or not. Essentially, the intellectual property asset may comprise any technology that is something of value to an entity.

While many entities are aware of their ownership of these intellectual property assets, management and marketing of these intellectual property assets become a challenge. In some instances, the assets are managed through a legal department, such as an intellectual property department. However, few of these entities actively seek to market, license, or sell assets considered incidental to their normal course of business. Often, assets that are considered core to the entity's products or services are recognized and commercialized, but many other assets often remain untapped for potential value.

SUMMARY OF THE INVENTION

Embodiments of the present invention overcome or substantially alleviate prior problems associated with assessing commercial viability and marketability of assets (e.g., intellectual property assets). In exemplary embodiments, an asset assessment system receives disclosure information about the asset and assembles the disclosure information into an asset disclosure. The disclosure information comprises information indicating at least one taxonomy segment associated with the asset.

An attribute grade may then be determined based on the disclosure information. Each response to an attribute question comprises a value. Additionally, each attribute question comprises a question weight. A sum of all question weights within, for example, an attribute survey will equal 100 or 100%. In one embodiment, the attribute grade may then be calculated by multiplying the response value and the question weight and summing all such results for the asset disclosure. In some embodiments, client or customer feedback or opinions may be factored into the attribute grade.

A market grade may also be determined based on market data for at least one taxonomy segment. In exemplary embodiments, each asset disclosure is categorized under at least one taxonomy segment. Market data for each taxonomy segment may then be reviewed in order to calculate a market grade. For embodiments comprising more than one taxonomy segment, the market grade for each taxonomy segment may then be combined to generate a final market grade. In some embodiments, client or customer feedback or opinions may be factored into the market grade.

A final grade based on the attribute grade and the market grade (or final market grade) is then calculated. This final grade provides an indication of the viability and marketability of the asset. The final grade may then be output to a user.

DETAILED DESCRIPTION OF EXEMPLARY EMBODIMENTS

Embodiments of the present invention are directed to systems and methods for determining the commercial viability and marketability of assets. These assets may comprise, for example, new or revised software scripts, engineering designs, technologies, processes for performing an activity, or any other innovative solutions, products, or services, be it tangible or intangible. Essentially, the asset may comprise any technology that is something of value to an entity. In exemplary embodiments, the asset may comprise any real or intellectual property that is valuable to an entity, and of which the entity would like to assess the viability and marketability.

Exemplary embodiments perform an analysis process which grades the asset. In exemplary embodiments, an attribute grade is determined based on asset characteristics. A market grade may also be determined based on one or more taxonomy segments in which the asset is classified. The taxonomy comprises categories or segments in which the asset may be classified. A final grade is then calculated based on both the attribute grade and the market grade. The final grade represents an assessment of the viability or marketability of the asset.

Figure 1:
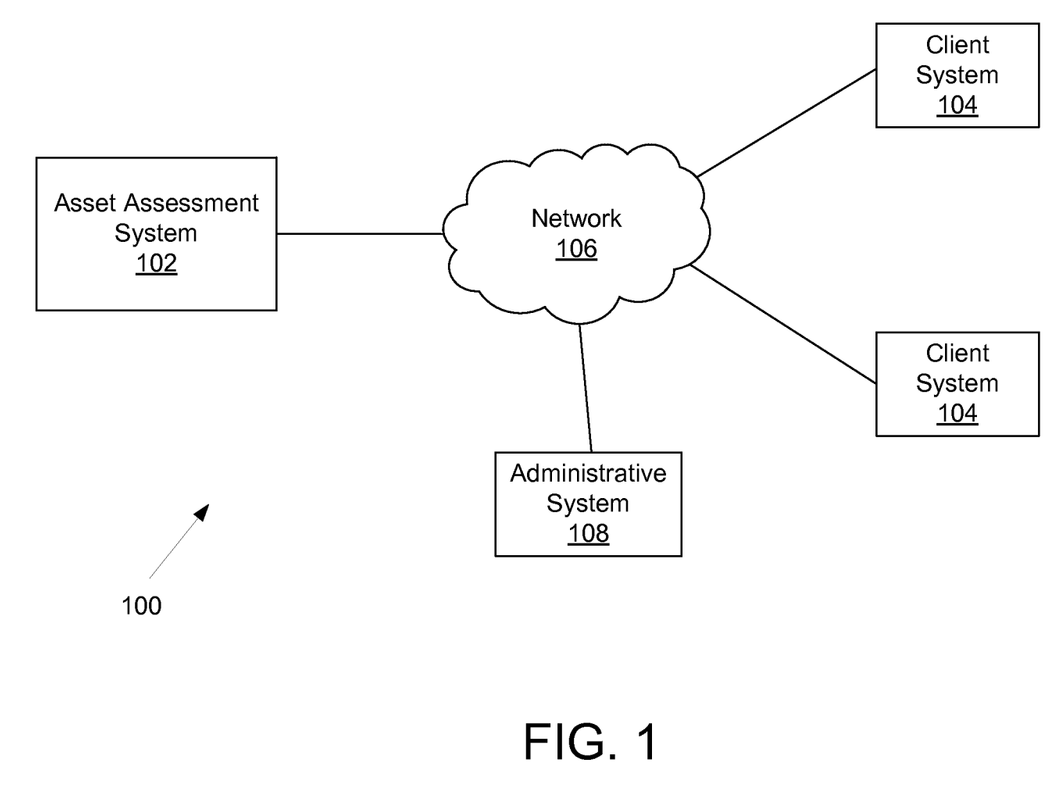
FIG. 1 illustrates an exemplary environment in which embodiments of the present invention may be practiced.

FIG. 1 illustrates an exemplary environment 100 in which embodiments of the present invention may be practiced. In one embodiment, an asset assessment system 102 is hosted outside of a client system 104 but connected thereto via a network 106. In exemplary embodiments, the asset assessment system 102 comprises one or more servers that are configured to perform the viability and marketability analysis. The asset assessment system 102 will be discussed in more detail in connection with FIG. 2 below.

The client system 104 is associated with a client. The client may comprise any entity (e.g., enterprise, firm, organization, individual, university) that desires to determine the viability and marketability of an asset owned by the entity. In accordance with one embodiment, an interface is provided to the client system 104 for input of information regarding the client's assets to the asset assessment system 102 via the network 106. In an alternative embodiment, the asset assessment system 102 may be embodied within the client system 104. In this embodiment, the asset assessment system 102 may be located within a firewall of the client system 104, for example. Any number of client systems 104 may be embodied within the environment 100.

The network 106 may comprise a wide area network, local area network, or any other network which provides a mechanism for exchange of information. These mechanisms for exchange of information need not be limited to computing networks. For example, the network may comprise a public switch telephone network (PSTN) whereby information may be communicated between individuals associated with the asset assessment system 102 and the client system 104.

In a further embodiment, an administrative system 108 may be coupled to the network 106. The administrative system 108 may be configured to provide management functionalities for the asset assessment system 102 and the client system 104 in certain situations. For example, in a case where the client system 104 and the asset assessment system 102 are located behind a firewall at a user's site, it may be necessary that the administrative system 108 be located elsewhere (accessible via the network 106) so that the administrative system 108 may communicate with the asset assessment system 102 and the client system 104 to aggregate, organize, combine, and/or do other analysis.

Figure 2:
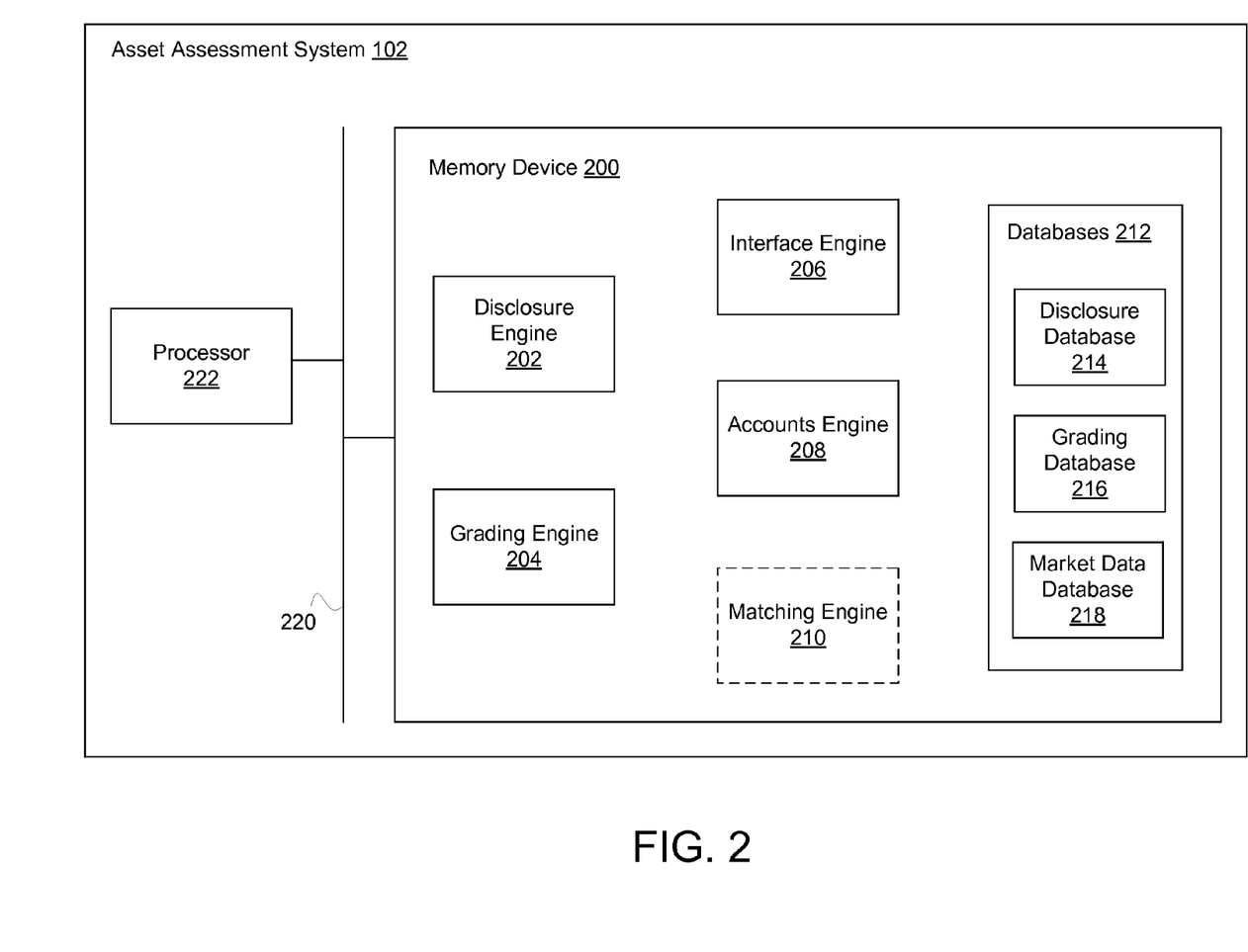
FIG. 2 is a block diagram of an exemplary asset assessment system.

Referring now to FIG. 2, a detailed block diagram of the exemplary asset assessment system 102 is shown. In exemplary embodiments, the asset assessment system 102 may comprise one or more memory or storage devices 200 which include a disclosure engine 202, grading engine 204, interface engine 206, accounts engine 208, an optional matching engine 210, and a plurality of databases 212. The databases 212 may comprise a disclosure database 214 for storing asset disclosures, a grading database 216 for storing grading results, and a market data database 218 for storing current market data for one or more taxonomy segments. Instructions can be retrieved from the memory device 200 via a bus 220 and executed by a processor 222. Alternative embodiments of the present invention may comprise more, less, or other functionally equivalent components.

The exemplary disclosure engine 202 is configured to receive and maintain asset disclosures. Each asset disclosure may comprise a predetermined set of data describing attributes of a particular asset. The data may comprise details such as, for example, name of the asset, creator(s) of the asset, description of the asset, and so forth. In some embodiments, the asset disclosure may be provided by the creator of the asset. In other embodiments, a manager, project leader, or any other individual associated with the asset may provide the asset disclosure. The disclosure engine 202 will be discussed in more detail in connection with FIG. 3.

The exemplary grading engine 204 is configured to analyze attributes and market data associated with each asset in order to determine viability or marketability of the asset. In exemplary embodiments, the analysis results in a final grading of the asset. In some embodiments, the final grading may output as a value associated with a grading scale such as a star system (i.e., 1 star, 2 star, 3 star, etc.). Alternative grading systems and scales may also be utilized. The grading engine 204 will be discussed in more detail in connection with FIG. 4 below.

In exemplary embodiments, the interface engine 206 is configured to provide one or more graphical user interfaces to an individual associated with the client system 104. The graphical user interface (GUI) may comprise a disclosure interface for exchange of asset disclosure information. In other embodiments, the GUI may comprise an attribute interface configured for receipt of attribute information associated with the asset. In one example, the attribute interface provides an attribute survey which asks questions to a user regarding the asset. In yet other embodiments, the GUI may comprise an information portal or dashboard configured to provide asset information including grading results for one or more assets to individuals associated with the client system 104.

The exemplary accounts engine 208 is configured to set-up and maintain accounts for the client systems 104. In some embodiments, an individual creating the account will provide information such as title, organization, division, etc. In some embodiments, this information may be used by the asset assessment system 102 to determine which individuals within a particular division, for example, should be contacted to provide information for the asset disclosure. Once the individual creates an account or otherwise registers with the asset assessment system 102, the individual may be allowed to generate an asset disclosure or otherwise provide information for the asset disclosure. In some embodiments, a position, title, organization, or division of the individual may determine a type of attribute survey the individual will receive. For example, an individual in a software development division may receive a software attribute survey, while an individual in a sales division may receive a service attribute survey.

The optional matching engine 210 may be configured to perform a matching process which matches asset disclosures stored in the disclosure database 214, for example, with licensing, acquisition, or other marketing opportunities. In exemplary embodiments, one or more taxonomy segments may be assigned to each asset disclosure. Thus, in one embodiment, the matching engine 210 may access the disclosure database 214 for a particular taxonomy segment of interest, and pull up details on one or more assets (via the asset disclosure) in the taxonomy segment, as well as see which potential licensees/licensors or buyers/sellers have products in the same taxonomy segment.

An asset assessment system 102 that is hosted may further comprise one or more enterprise databases. For example, an independent software vendor (ISV) database may be maintained. The enterprise database may include a roadmap of what assets a particular enterprise currently has as well as information regarding taxonomy segments the enterprise is interested in entering. In one embodiment, this roadmap may be input by an individual associated with the enterprise (i.e., client system 104). Subsequently, a license or acquisition match may be performed by the matching engine 210 to determine which of the clients or enterprises have disclosed assets (e.g., submitted disclosures under the taxonomy segment) in a requested taxonomy segment. A match request may thus be matched back through the asset assessment system 102 by the matching engine 210. For example, a particular product group at Company A has submitted similar technologies in a particular taxonomy segment. This particular product group may thus have something that another enterprise is looking for in the same taxonomy segment. A request for an asset disclosure may then be sent to a particular product group in Company A.

It should be noted that while the above embodiment is directed to enterprises, exemplary embodiments may be applied to any entity (e.g., university, individual, venture capital (VC) firm). For example, a VC firm may use embodiments of the present invention to assess a potential spin-off opportunity. In another example, an individual may assess the viability of an invention (e.g., whether to patent or market the invention). Thus, any entity may use embodiments of the present invention as a decision making tool to assess any asset.

Figure 3:
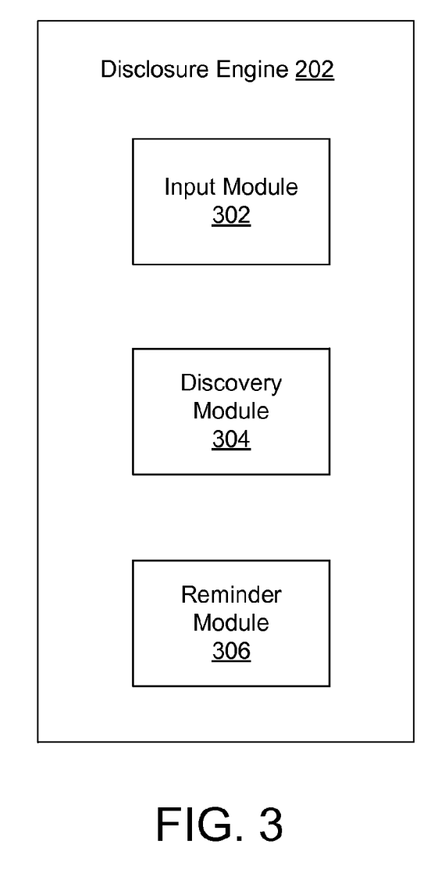
FIG. 3 is a block diagram of an exemplary disclosure engine.

Referring now to FIG. 3, the disclosure engine 202 is shown in more detail. The disclosure engine 202 is configured to receive, update, and maintain asset disclosures. In exemplary embodiments, the disclosure engine 202 may comprise an input module 302, discovery module 304, and reminder module 306. Alternative embodiments may comprise more, less, or functionally equivalent components and still be within scope of exemplary embodiments.

The exemplary input module 302 is configured to receive data about the asset via the GUI provided by the interface engine 206. Ideally, the data may indicate one or more taxonomy segments in which the asset is classified. In some embodiments, the taxonomy segment may be directly provided by the individual creating the asset disclosure. In other embodiments, the taxonomy segment may be inferred by other information received by the input module 302 or the discovery module 304. For example, an asset disclosure provided by a software coder in a tax preparation division, may be classified in a tax preparation software taxonomy segment. Alternatively, the disclosure engine 202 may provide a listing of one or more potential taxonomy segments from which the individual may select from. The information may then be stored in the disclosure database 214.

In accordance with exemplary embodiments, the input module 302 may provide an attribute survey. The attribute survey comprises a series of questions whose responses are used to build or supplement the asset disclosure. These responses may also be used in performing an attribute grading process as will be discussed in detail in connection with FIG. 6.

In some embodiments, the input module 302 may also receive feedback including opinions. The feedback may be received from customers, clients, the individual creating the asset disclosure, or any other entity associated with the client system 104. The feedback may also be associated with a group (e.g., a set of customers).

In some embodiments, the disclosure engine 202 is configured to search for assets of interest and to generate an asset disclosure based on the search. The search and asset disclosure generation may be performed by the discovery module 304 in these embodiments. The discovery module 304 may be optional in some embodiments. For example, a software asset may be searched for presence of "Open Source" code, and based on results of this search, a binary attribute may be identified based on the presence or absence of such code. Input data, corresponding attributes, and search terms (e.g., "Open Source") may be customizable and may vary according to evaluation of each type of asset.

The reminder module 306 may be configured to provide reminders to a creator of an asset disclosure or an appropriate individual associated with an asset (e.g., project manager) to update, revise, or complete an incomplete asset disclosure. For example, if an individual starts to input information for an asset disclosure but does not complete the asset disclosure within a certain time period, the reminder module 306 may send an e-mail or other message to the individual with a reminder to finish the asset disclosure. Alternatively, an incomplete asset disclosure originally created by the discovery module 304 may trigger the reminder module 306 to send a message to an appropriate individual to complete the asset disclosure.

Figure 4:
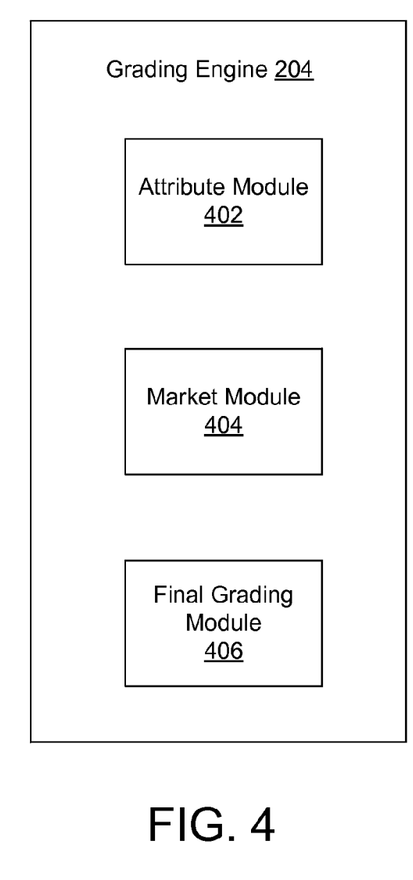
FIG. 4 is a block diagram of an exemplary grading engine.

Referring now to FIG. 4, the exemplary grading engine 204 is shown in more detail. The grading engine 204 may be configured to determine viability and/or marketability of an asset based on current or most recent market data and attributes associated with the asset. In exemplary embodiments, the grading engine 204 comprises an attribute module 402, a market module 404, and a final grading module 406. Alternative embodiments may comprise more, less, or functionally equivalent components. For example, the attribute module 402, market module 404, and final grading module 406 may be combined within a single module.

The exemplary attribute module 402 is configured to determine an attribute grade based on the attributes provided in the asset disclosure. In exemplary embodiments, the attribute module 402 will calculate a grade or score based on attributes received in the asset disclosure. For example, a first attribute question (e.g., from an attribute survey) may ask "why did the company choose to create the software instead of buying." Each response is associated with a different value. For example, a response that "it was cheaper to build than buy" may have a value of zero; "similar software exists on the market but it does not meet our needs" may have a value of three; "similar software exists but only sold by start-ups" may have a value of eight; and "couldn't find any similar software on the market" may have a value of ten.

In some embodiments, the attribute grade may also factor in feedback including opinions. The feedback may be received, for example, by the input module 302. Feedback provides human cognizance factors which, in itself, represent attributes of the asset. For example, a user providing responses to an attribute survey may respond to a survey question with conjecture or speculation (e.g., best guess). In some embodiments, attribute scores based on feedback and related attributes may be weighted more heavily than attribute scores based on facts.

In exemplary embodiments, each attribute question comprises a question weight. A sum of all question weights within, for example, an attribute survey will equal 100 or 100%. Continuing with the above example, the attribute question may comprise a question weight of 11%. If the response to the attribute question is "similar software exists but only sold by start-ups," then, the score component from this first attribute question may be calculated as eight times 0.11. The total attribute score comprises a sum of all score components of the attribute survey.

It should be noted that an individual associated with the client system 104 or the asset assessment system 102 may create or customize attribute surveys. As such, questions may be created or customized. Similarly, question weights and response values may be set or customized. Furthermore, pre-existing or default questions, question weights, and response values may be edited. In yet other embodiments, attribute grading parameters may be customized to include feedback from a division, organization, or group as well as individuals, be it inside or outside of the client or client system 104.

In further embodiments, questions may be tiered or set up as a matrix. For example, questions may be linked whereby an answer to a first question leads to a second. The answer to the first question would not be weighted because a matrix is built where the answer to the first question is tied to the second question. The answers to the first and second questions, in this example, thus correspond to a location within the matrix which indicates a response value for the combined answers.

The exemplary market module 404 is configured to determine a market grade based on current (or as recent as available) market data. In exemplary embodiments, each asset disclosure is associated with at least one taxonomy segment. Market data for each associated taxonomy segment may then be reviewed by the market module 404 in order to calculate a market grade. For example, sales forecasts for the industry segment associated with the taxonomy segment may be reviewed. Additional components for the taxonomy segment may include, for example, market segment growth rate, number of similar products in the segment, number of competitors in the segment, revenues per company or product, industry lifecycle stage, venture capital funding index, stock price data, age of industry, etc.

In one example, the asset may comprise a calendaring software product. If current market data indicates that a large number of such products exist, a relatively low market grade may result (e.g., a negative market grade). Alternatively, market data may indicate a large number of potential licensees or buyers for that type of product, resulting in a high or positive market grade. It should be noted that the market data may comprise any number of types of data and not simply data considered "market data." For example, customer feedback may also be utilized by the market module 404 to determine the market grade.

The market grade may be static or dynamic. For example, the market grade may be determined based on predetermined existing static data. This status data, however, may be updated (e.g., quarterly or annually) either automatically or manually. Once updated, the market grade may be adjusted. In other embodiments, the market grade may additionally or alternatively be based on dynamic data, such as stock market data.

In some embodiments, analysis or scoring components of the market module 404 may be customized. For example, scoring components may be created based on different market data components available for a specific taxonomy segment. Alternatively, rule modules may be customized or developed to refine or modify market grading analysis when not all market components or data are available or other criteria available. The rule modules may also make adjustments on-the-fly based on any number of factors (e.g., user/client specific variants, specific data from the attribute module).

The final grading module 406 is configured to determine a final grade based on both the attribute grade and the market grade. The final grade may be based on any number of particular combinations/weights of the attribute grade and the market grade. According to one embodiment, the market grade is added with the attribute grade to obtain a final grade. Alternative embodiments may contemplate other methods for combining the attribute grade and the market grade. For example, the attribute grade may be multiplied by the market grade, and the resulting final grade may be converted to a comparable grading scale. In another example, the attribute grade may be increased or decreased in proportion to the value of the market grade. In some embodiments, the criteria used to combine the attribute grade and the market grade may be customized by a user.

This final grade may then be converted to a grading scale for output (e.g., 1-100 or 1 to 5 stars). A cutoff scale may be established to indicate viability (e.g., all grades above 70 indicate viability). Alternatively, the final grade may be binary (e.g., "viable" or "not viable"). In yet other embodiments, the output may comprise the final grade in lieu of the grading scale.

Figure 5:
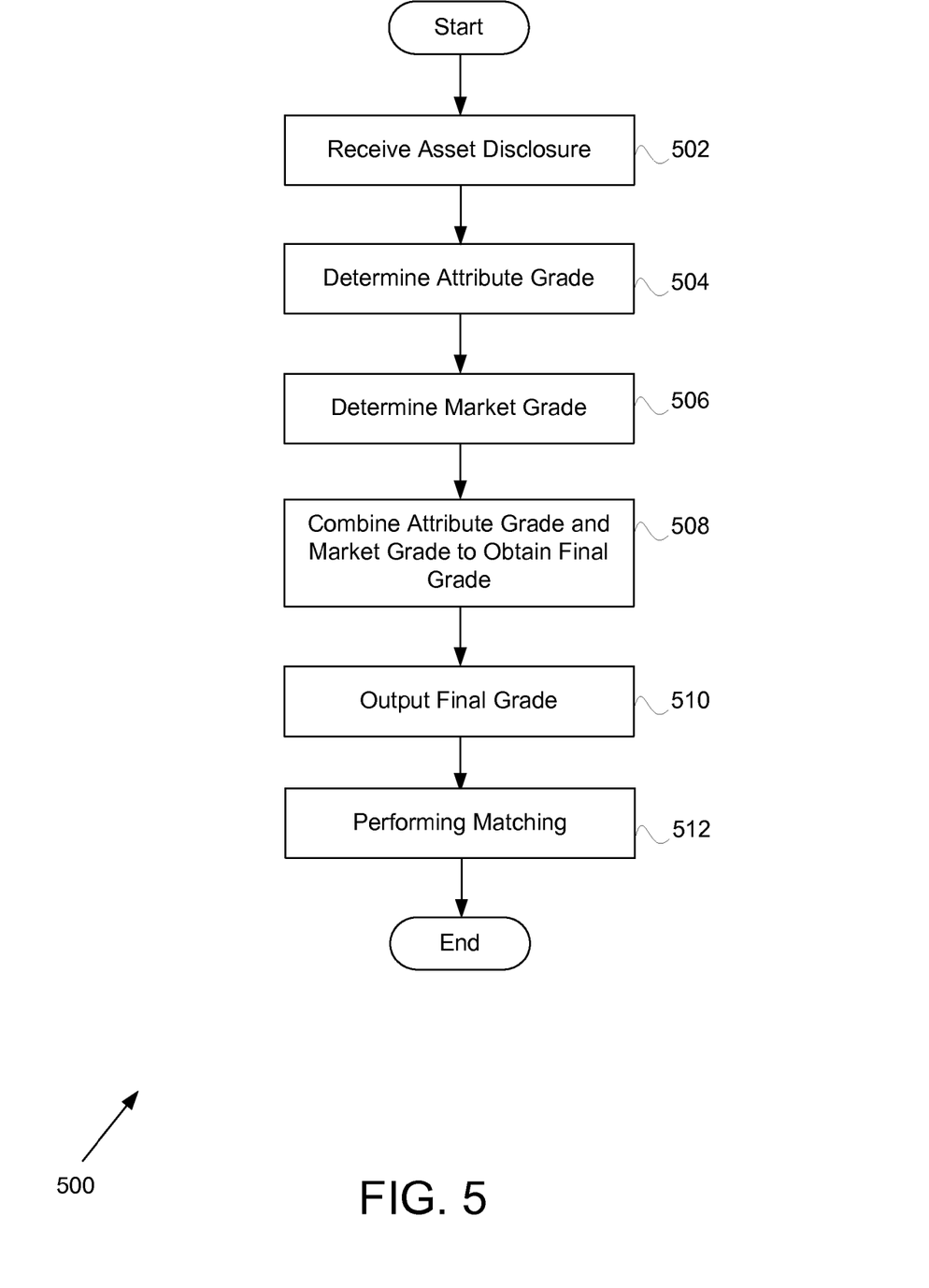
FIG. 5 is a flowchart of an exemplary method for determining viability of an asset.

Referring now to FIG. 5, a flowchart 500 of an exemplary method for determining the viability and marketability of an asset is provided. In step 502, an asset disclosure is received by the asset assessment system 102. In one embodiment, an attribute survey is provided by the interface engine 206. Answers to the attribute survey may then be stored in the disclosure database 214. In an alternative embodiment, the discovery module 304 may search (e.g., crawl) the client system 104 for potential assets and automatically populate an attribute survey or generate an asset disclosure. If the asset disclosure is incomplete, an individual associated with the asset disclosure may be sent a message or reminder to complete the asset disclosure survey.

The attribute grade is then determined in step 504. In exemplary embodiments, the attribute module 402 reviews attributes in the asset disclosure to determine an attribute grade to associate with the asset disclosure. Step 504 will be discussed in more details in connection with FIG. 6.

The market grade is determined in step 506. In exemplary embodiments, the market module 404 reviews current or available market data for one or more taxonomy segments associated with the asset disclosure. Based on the market data, the market score or grade may be determined for the asset. Step 506 will be discussed in more detail in connection with FIG. 7.

In step 508, the attribute grade and the market grade are combined to obtain a final grade. In accordance with one embodiment, the final grading module 406 adds the market grade to the attribute grade to arrive at the final grade. For example, if the attribute grade is 8.5, but the market grade is −0.5, then the final grade is 8.0. Alternative embodiments may utilize other methods to determine a final grade. For example, the attribute grade of 8.5 will indicate three stars for the asset. However, the market grade of −0.5 may drop the star rating down to two stars.

The final grade may then be output in step 510. In one embodiment, the final grade may be output to a grading database 216. In other embodiments, the final grade may be output via a dashboard GUI to individuals associated with the client system 104 of the asset.

In step 512, a matching operation may be performed. In some embodiments, if the final grade of an asset indicates that the asset is viable, for example, the asset may be matched to potential market opportunities. In other embodiments, a match operation may be performed whereby a potential licensee or asset acquirer may provide requirements which are matched to marketable or viable assets. It should be noted that step 512 may be optional in some embodiments.

The method of FIG. 5 is exemplary and alternative methods may comprise more steps, less steps, combine steps, or reordered steps. For example, the market grade (step 506) may be determined prior to determining the attribute grade (step 504). In another alternative example, the matching step 512 may be replaced by a further assessment step whereby assets considered viable based on the final grade may be input into an analysis system where further feedback (e.g., from a group of individuals or a community) and market analysis may be performed. One specific example of this analysis system is described in U.S. Provisional Patent Application No. 60/964,324, entitled "System and Method for Automatically Assessing the Commercial Viability and Market Value of Intellectual Property Assets," which is incorporated by reference.

Figure 6:
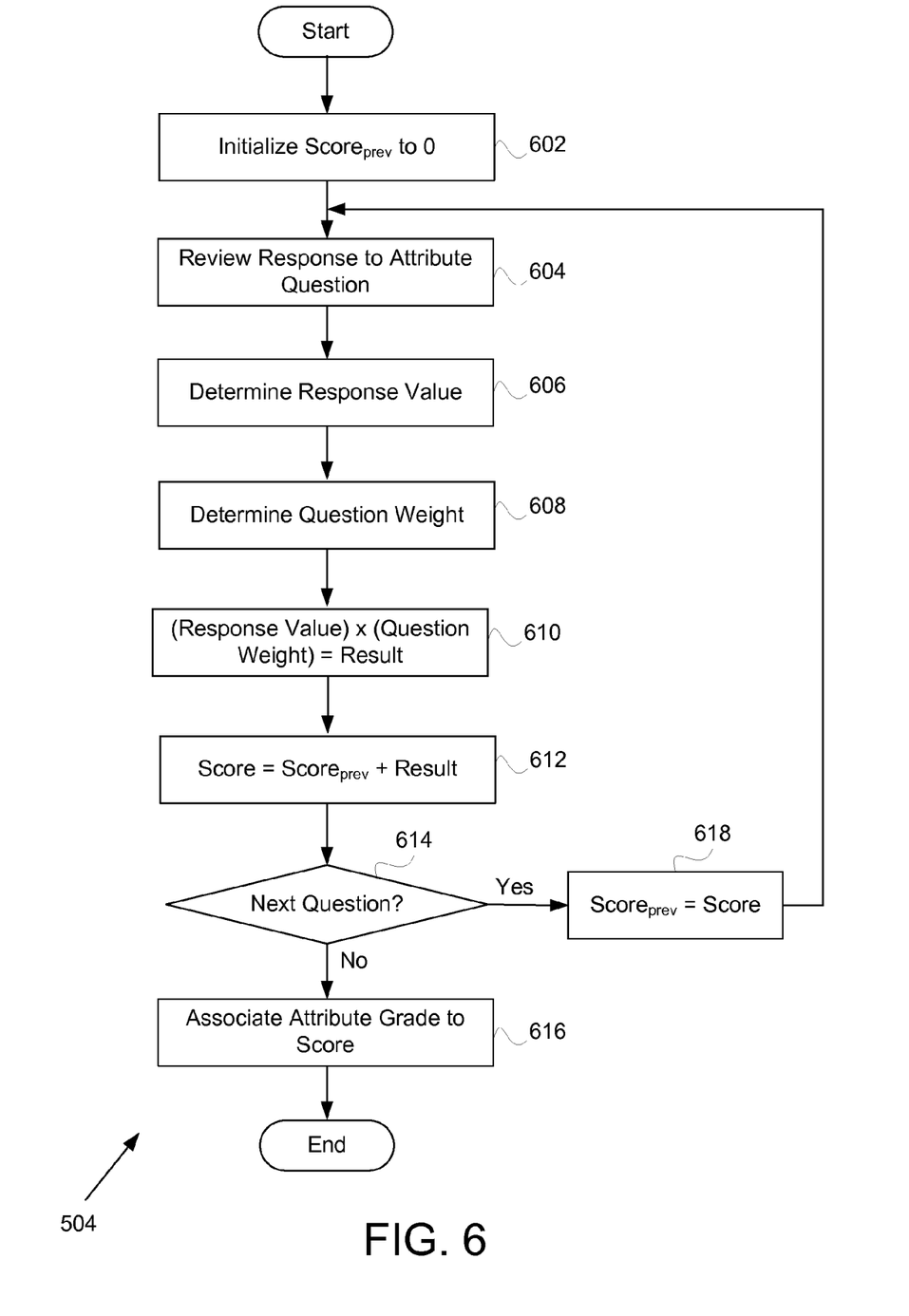
FIG. 6 is a flowchart of an exemplary method for determining an attribute grade.

Referring now to FIG. 6, an exemplary flowchart of the method for determining the attribute grade (step 504) is shown. In step 602, the attribute module 402 initializes $score_{prev}$ to zero. Next, the attribute module 402 reviews a first attribute or a response to a first attribute question in step 604. In exemplary embodiments, the attribute module 402 may access an asset disclosure stored in the disclosure database 214 to determine the response. In an alternative embodiment, the response may be received and reviewed in real-time.

A response value is determined in step 606. In exemplary embodiments, each attribute question (e.g., from an attribute survey) may ask a particular question regarding an attribute of the asset. Each response is associated with a different value. As such, response A may have a value of zero; response B may have a value of three; response C may have a value of eight; and response D may have a value of ten. Therefore, if the response to the first attribute question is response C, the response value is eight. In some embodiments, the attribute or attribute response comprises feedback (e.g., opinion) or conjecture from one or more individuals or groups.

In step 608, a question weight is determined. In exemplary embodiments, each attribute question comprises a question weight. A sum of all question weights within, for example, an attribute survey will equal 100 or 100%. Continuing with the above example, the attribute question may comprise a question weight of 11%.

Once the response value and question weight is determined, a score component may be determined in step 610. In exemplary embodiments, the score component (i.e., result) may equal the response value times the question weight. Therefore, if the response to the attribute question is response C then, the score component from this first attribute question is eight times 0.11 (e.g., 11%) in the above example. Alternative embodiments may comprise a different algorithm to determine a score component.

In step 612, a summed score component is determined. Thus, the result of step 610 may be added to any previously calculated results. The total attribute score comprises a sum of all score components of the attribute survey and/or attributes in the asset disclosure.

A determination is then made in step 614 as to whether there is a next attribute question or attribute in the asset disclosure. If there are no further attributes to score, then the final attribute score may be associated with an attribute grade in step 616. In some embodiments, this association may comprise converting the final attribute score into a rating system, such as a star system (e.g., 1 star, 2 star, 3 star, etc.). In alternative embodiments, the final attribute score may be the attribute grade.

If in step 614, another attribute does need to be scored, then in step 618, a new $score_{prev}$ is set to the currently calculated score from step 612. Then the process returns to step 604 to repeat the calculation of the next attribute score component and summed score component.

It should be noted that the method of FIG. 6 is exemplary. Alternative embodiments may comprise similar steps and still be within the scope of exemplary embodiments of the present invention. For example, the response value (step 606) may be determined after determining the question weight (step 608). In some embodiments, feedback or conjecture may also be factored into the final attribute score. In these embodiments, feedback attribute score components may be weighted more heavily then factual attribute score components.

Figure 7:
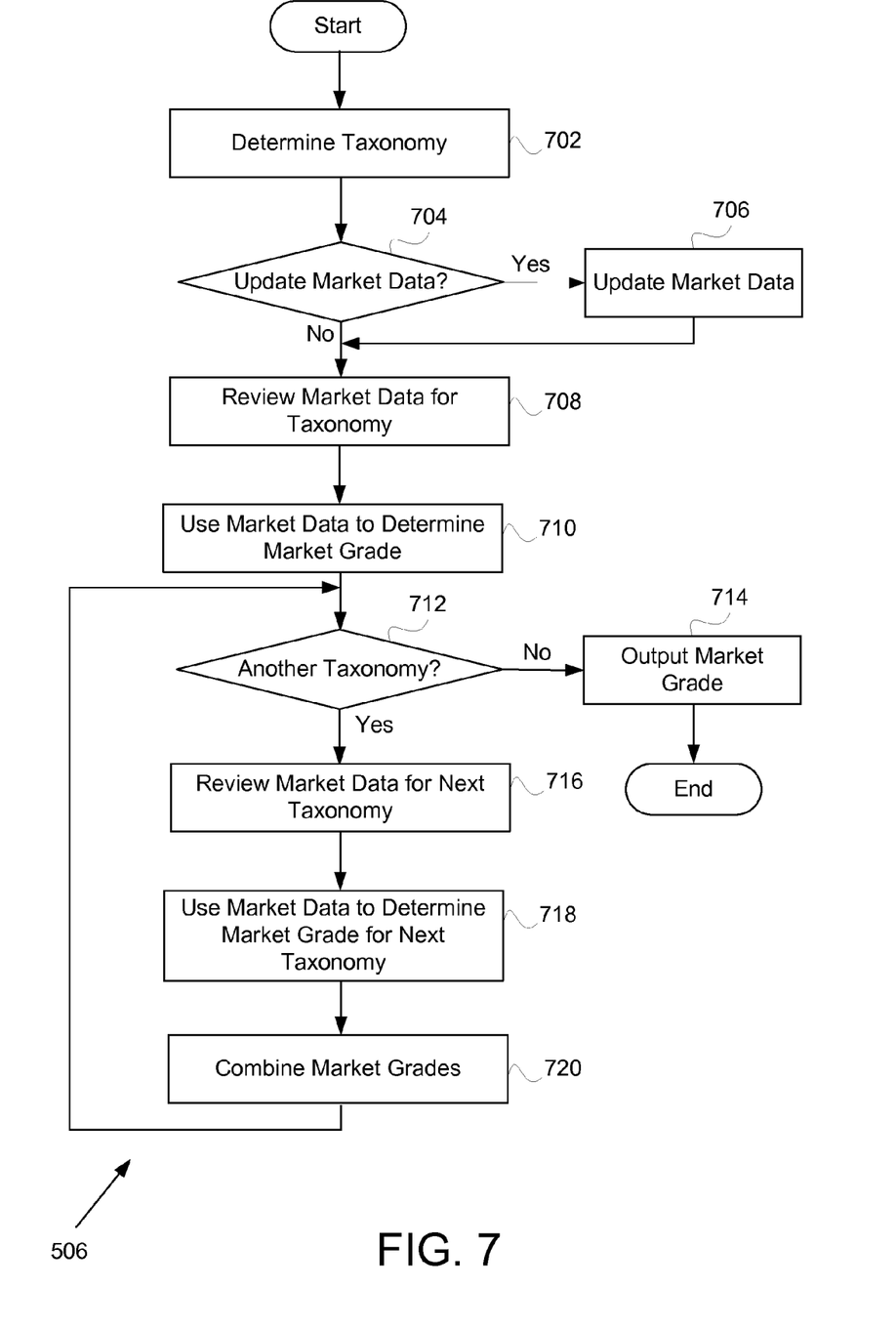
FIG. 7 is a flowchart of an exemplary method for determining a market grade.

Referring now to FIG. 7, an exemplary flowchart for determining the market grade (step 506) is shown in more detail. In step 702, a taxonomy segment for the asset being graded is determined. In some embodiments, the taxonomy segment may be directly provided by an individual creating the asset disclosure. In other embodiments, the taxonomy segment may be inferred by other information provided or gathered to create the asset disclosure. It should be noted that an asset disclosure may be categorized with more than one taxonomy segment. For example, a first taxonomy segment may be used to classify a software product (e.g., personal income tax software). A second taxonomy segment may be used to classify software components (e.g., executable unit of functionality). A third taxonomy segment may be used to classify tools, utilities, and scripts. Any number of taxonomy segments or combinations of taxonomy segments may be used to classify an asset.

Once the taxonomy segment is determined, a determination may be made as to whether the market data for the taxonomy segment is the most up-to-date in step 704. In some embodiments, the market module 404 may review a date of the last update and determine if the date is past a predetermined threshold for current data. In other embodiments, the market module 404 may automatically search for more current data. Updated market data may be found, for example, by accessing particular market data providers, crawling the Internet, or manually inputting updated market data. In yet other embodiments, the market data is updated periodically (e.g., once a year).

If the market data needs to be updated, then the updating occurs in step 706, whereby the market data database 218 is updated. It should be noted that steps 704 and 706 may be optional or not practiced every time the market module performs the market grading analysis.

In step 708, a review of the market data is performed. In exemplary embodiments, the market module 404 may access the market data database 218 and review the market data. In an alternative embodiment, the market module 404 may search for, find, and review current market data in real-time. It should be noted that market data may be relative to, and compared to, data from other taxonomy segments. That is, each data component of the market data may stand on its own or be compared to or combined with other data components.

Based on the market data, a market grade may be determined in step 710. In exemplary embodiments, a review of the market data for the segment or the taxonomy segment will provide a market grade or coefficient which may be applied to the attribute grade. For example, if there are a high number of competitors in the segment with similar products, then a market grade component may be negative (e.g., −0.5). However, if the segment has a high growth forecast, then a market grade component may be very positive (e.g., +1). In some embodiments, the various market grade components may be combined to obtain the market grade for the taxonomy segment. Each market grade component may also be weighted (e.g., growth rate may be weighted more heavily than stock prices).

In step 712, a determination is made as to whether the asset disclosure is categorized under another taxonomy segment. If there are no further taxonomy segments, then the market grade may be output in step 714. However, if there is another taxonomy segment, then the market data for the next taxonomy segment may be reviewed in step 716. In some embodiments, the market data may also be updated for the next taxonomy segment or the market data for all taxonomy segments may be updated in step 706 at the beginning of the method. It should be noted that taxonomy segments may be added and changed with respect to each asset at any time, thus dynamically adjusting the market grade.

The market data is used to determine the market grade for the next taxonomy segment in step 718. The process for determining the market grade is similar to that described in step 710.

The determined market grades are then combined in step 720. For example, if the market grade or coefficient is −0.5 for a first taxonomy segment, but +1 for a second taxonomy segment, the combined market grade may be a sum of the two market grades (i.e., +0.5). In some embodiments, some taxonomy segments may be weighted higher or lower than other taxonomy segments. In further embodiments, the market grading may be modified on-the-fly, use only worse/best market grades, combine a highest and lowest market grade, average all market grades, or use any other mechanism for combining market grades.

The above-described modules can be comprised of instructions that are stored on storage media. The instructions can be retrieved and executed by the processor 222. Some examples of instructions include software, program code, and firmware. Some examples of storage media comprise memory devices and integrated circuits. The instructions are operational when executed by the processor 222 to direct the processor 222 to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. For example, embodiments of the present invention may be applied to any system (e.g., non speech enhancement system) as long as a noise power spectrum estimate is available. Therefore, these and other variations upon the exemplary embodiments are intended to be covered by the present invention.

The invention claimed is:

1. A computer-implemented method for determining viability of an asset, comprising:
   receiving on a server asset disclosure information for an asset;
   determining an attribute grade based on the asset disclosure information;
   determining a market grade based on market data for at least one taxonomy segment;
   determining a final grade based on the attribute grade and the market grade, the final grade providing an indication of viability of the asset;
   outputting by the server the final grade for display; and wherein receiving the asset disclosure information comprises providing a reminder when an asset disclosure remains incomplete for a predetermined period of time.

2. The method of claim 1 wherein receiving the disclosure information comprises providing an asset disclosure survey.

3. The method of claim 1 wherein receiving the asset disclosure information comprises searching for potential assets and corresponding asset disclosure information.

4. The method of claim 1 wherein determining the attribute grade comprises determining a question score based on a question weight and response value.

5. The method of claim 4 wherein the question weight and response value are based on a tiered series of attribute questions.

6. The method of claim 1 wherein the asset disclosure information comprises feedback, the feedback being used to determine the attribute grade.

7. The method of claim 1 wherein determining the market grade comprises updating the market data with current market data.

8. The method of claim 1 wherein determining the market grade comprises combining a plurality of market grade components for a taxonomy segment associated with the asset.

9. The method of claim 1 wherein determining the market grade comprises combining market grades for a plurality of taxonomy segments associated with the asset.

10. The method of claim 1 wherein outputting the final grade comprises converting the final grade according to a grading scale.

11. The method of claim 1 further comprising performing a match operation based on the viability of the asset.

12. A computer-implemented system for determining viability of an asset, comprising:
    a server;
    a disclosure engine on the server configured to receive asset disclosure information for an asset;
    an attribute module on the server configured to determine an attribute grade based on the asset disclosure information;
    a market module on the server configured to determine a market grade based on market data for at least one taxonomy segment;
    a final grading module on the server configured to determine a final grade based on the attribute grade and the market grade, the final grade providing an indication of viability of the asset;
    an interface engine on the server configured to output the final grade; and wherein the disclosure engine comprises a reminder module configured to provide a reminder to an individual when the asset disclosure information is incomplete for a predetermined amount of time.

13. The system of claim 12 wherein the disclosure engine comprises an input module configured to provide an asset disclosure survey.

14. The system of claim 12 wherein the disclosure engine comprises a discovery module configured to search for an asset and corresponding asset disclosure information.

15. The system of claim 12 wherein the market module is further configured to update the market data with most current market data available.

16. The system of claim 12 further comprising a matching engine configured to perform a match operation based on the viability of the asset.

17. A non-transitory machine readable medium having embodied thereon a program, the program providing instructions for a method for determining viability of an asset, the method comprising:
    receiving disclosure information for an asset;
    determining an attribute grade based on the disclosure information;
    determining a market grade based on market data for at least one taxonomy segment;
    determining a final grade based on the attribute grade and the market grade, the final grade providing an indication of viability of the asset;
    outputting the final grade; and wherein receiving the asset disclosure information comprises providing a reminder when an asset disclosure remains incomplete for a predetermined period of time.

18. A computer-implemented method for determining viability of an asset, comprising:
    receiving on a server asset disclosure information for an asset;
    determining an attribute grade based on the asset disclosure information;
    determining a market grade based on market data for at least one taxonomy segment;
    determining a final grade based on the attribute grade and the market grade, the final grade providing an indication of viability of the asset;
    outputting by the server the final grade for display;

and wherein determining the final grade comprises adjusting the attribute grade using the market grade.

\* \* \* \* \*